United States Patent

Terao et al.

[11] Patent Number: 5,713,578
[45] Date of Patent: Feb. 3, 1998

[54] HYDRAULIC SEALING DEVICE

[75] Inventors: Kiminobu Terao; Kouji Ueda; Mayumi Takada; Kenji Amano, all of Saitama, Japan

[73] Assignee: Honda Giken Kogyo Kabushishi Kaisha, Tokyo, Japan

[21] Appl. No.: 659,260

[22] Filed: Jun. 6, 1996

[30] Foreign Application Priority Data

Jun. 9, 1995 [JP] Japan ................... 7-143026

[51] Int. Cl.$^6$ ................................... F16J 15/46
[52] U.S. Cl. ..................... 277/27; 277/216; 277/220
[58] Field of Search ..................... 277/59, 27, 214, 277/215, 216, 220, 221

[56] References Cited

U.S. PATENT DOCUMENTS

| | | | |
|---|---|---|---|
| 3,186,723 | 6/1965 | Wagner | 277/59 |
| 3,259,392 | 7/1966 | Peickii et al. | 277/59 |
| 3,655,208 | 4/1972 | Walker | 277/221 |
| 4,053,163 | 10/1977 | Vegella | 277/124 |
| 4,098,515 | 7/1978 | Dakata | 277/165 |
| 4,498,681 | 2/1985 | Heinz | 277/215 |
| 4,741,509 | 5/1988 | Burch et al. | 277/205 |
| 5,178,400 | 1/1993 | Singh | 277/177 |
| 5,312,116 | 5/1994 | Quaglia | 277/27 |

FOREIGN PATENT DOCUMENTS 4262171  9/1992  Japan.

*Primary Examiner*—Scott Cummings
*Attorney, Agent, or Firm*—Lyon & Lyon LLP

[57] ABSTRACT

One end of a seal ring retained in a seal ring groove is formed in such a manner that it is offset radially inwardly from the other end, so that oil is permitted to leak by opening an abutment joint formed by the two ends in a condition in which no hydraulic pressure is applied. If a hydraulic pressure is supplied to bring a hydraulic actuator into an engaged state, the one end of the seal ring is deformed radially outwardly by the hydraulic pressure to come into close contact with a sealing surface and to close the abutment joint, thereby preventing the oil from-leaking past the oil ring. Consequently, upon engagement of the hydraulic actuator, a sealing property or salability of the oil can be assured, and upon releasing of the engagement of the hydraulic actuator, an oil leaking property of the seal ring can be provided, leaking property of the oil can be provided, thereby enhancing the responsiveness of the hydraulic actuator.

17 Claims, 20 Drawing Sheets

HYDRAULIC SEALING DEVICE

BACKGROUND OF THE INVENTION

1. Field of the Invention

The present invention relates to a hydraulic device for sealing with a seal ring between a first radially inner member and a second radially outer member rotatably fitted one over another.

2. Description of the Related Art

Such a hydraulic sealing device is already known as disclosed, for example, in Japanese Patent Application laid-open No. 4-262171.

When a hydraulic clutch of a hydraulic pressure-balanced type (a hydraulic clutch having no check valve in an oil passage connected to an oil chamber) is brought into an engaged state, the time required for the engagement can be shortened to enhance the responsiveness by reducing the amount of oil leaked from the oil passage connected to the oil chamber. When the engagement is released, the time required to release the engagement can be shortened to enhance the responsiveness by permitting the oil to be leaked from the oil passage.

However, the known seal ring has a problem that it is impossible to sufficiently enhance the responsiveness of the hydraulic clutch, because the known seal ring is not designed so that the sealing and leaking properties of the oil are reconciled with each other.

SUMMARY OF THE INVENTION

Accordingly, it is an object of the present invention to provide a hydraulic sealing device designed so that the engagement of disengagement of the hydraulic actuator such as a hydraulic clutch, a hydraulic brake and the like can be promptly performed without a time lag generated.

To achieve the above object, according to the present invention, there is provided a hydraulic sealing device, comprising an annular seal ring groove formed in one of a radially inner first member and a radially outer second member rotatably fitted with each other, and a seal ring mounted in the seal ring groove to abut against a sealing surface formed on the other of the first and second members, the seal ring having an abutment joint whose opposed ends are radially superposed on each other, wherein one end of the seal ring in a free state is formed such as to be radially offset from the other end, and wherein when no hydraulic pressure is applied, the one end of the seal ring is spaced apart from the sealing surface to open the abutment joint, and when a hydraulic pressure is applied, the one end of the seal ring is urged in a direction to abut against the sealing surface to close the abutment joint.

With the above arrangement, the one end of the seal ring in the free state is formed in such a manner that it is radially offset from the other end, so that when no hydraulic pressure is applied, the one end of the seal ring is spaced apart from the sealing surface to open the abutment joint, and when the hydraulic pressure is applied, the one end is urged in a direction to abut against the sealing surface, thereby closing the abutment joint. Therefore, when the hydraulic actuator is to be brought into the engaged state, the abutment joint of the seal ring can be closed to seal the hydraulic pressure, thereby promptly bring the hydraulic actuator into the engaged state. When the engagement of the hydraulic actuator is to be released, the abutment joint of the seal ring can be opened to permit the hydraulic pressure to be leaked, thereby promptly releasing the engagement of the hydraulic actuator.

In addition, according to the present invention, there is provided a hydraulic sealing device, comprising an annular seal ring groove formed in one of a radially inner first member and a radially outer second member rotatably fitted with each other, and a seal ring mounted in the seal ring groove to abut against a sealing surface formed on the other of the first and second members, the seal ring having an abutment joint whose opposed ends are axially superposed on each other, wherein one end of the seal ring in a free state is formed such as to be axially offset from the other end, and wherein when no hydraulic pressure is applied, the one end of the seal ring is spaced apart from the other end to open the abutment joint, and when a hydraulic pressure is applied, the one end of the seal ring is urged in a direction to abut against the other end to close the abutment joint.

With the above arrangement, the one end of the seal ring in the free state being formed in such a manner that it is axially offset from the other end, so that when no hydraulic pressure is applied, the one end of the seal ring is spaced apart from the other end to open the abutment joint, and when the hydraulic pressure is applied, the one end is urged in the direction to abut against the other end to close the abutment joint. Therefore, when the hydraulic actuator is to be brought into the engaged state, the abutment joint of the seal ring can be closed to seal the hydraulic pressure, thereby promptly bring the hydraulic actuator into the engaged state. When the engagement of the hydraulic actuator is to be released, the abutment joint of the seal ring can be opened to permit the hydraulic pressure to be leaked, thereby promptly releasing the engagement of the hydraulic actuator.

The above and other objects, features and advantages of the invention will become apparent from the following detailed description of preferred embodiments taken in conjunction with the accompanying drawings.

DETAILED DESCRIPTION OF THE PREFERRED EMBODIMENTS

A first embodiment of the present invention will now be described with reference to FIGS. 1 to 7.

Figure 1:
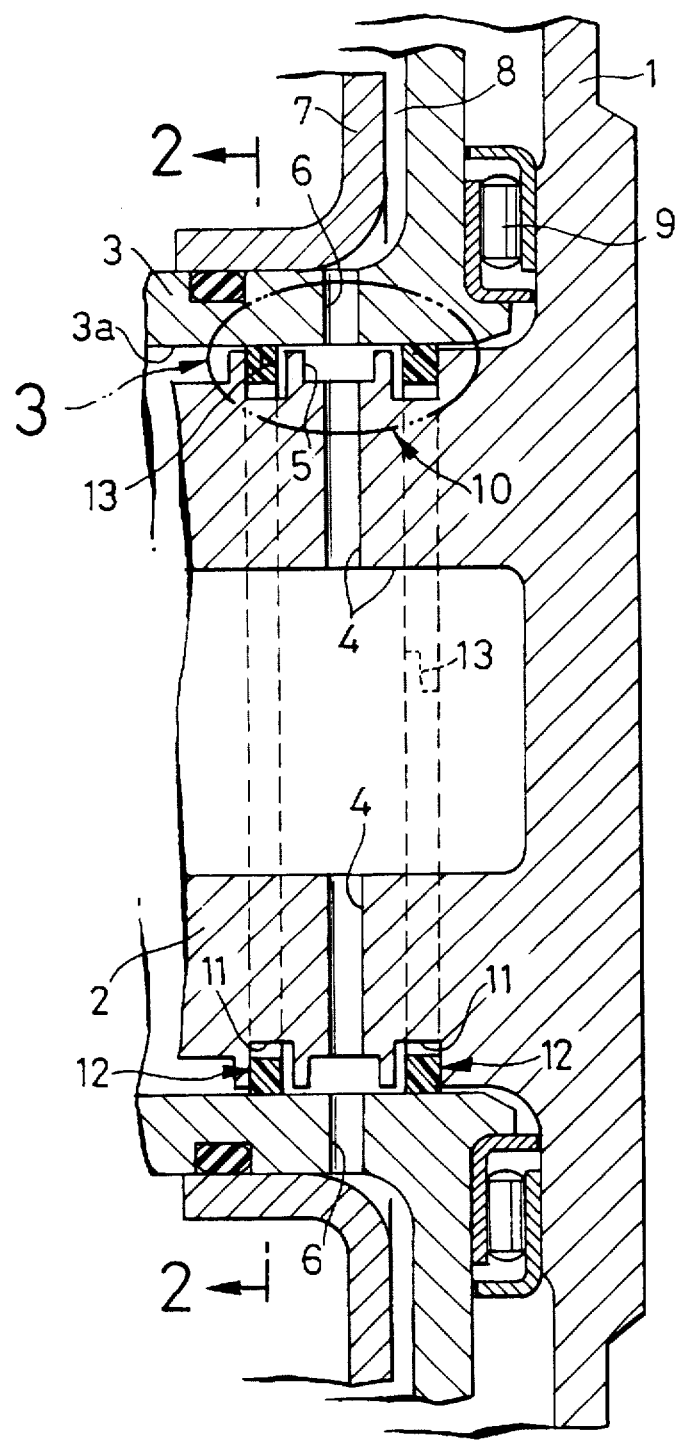
FIG. 1 is a vertical sectional view of a hydraulic apparatus including a hydraulic sealing device according to a first embodiment of the present invention.
Figure 2:
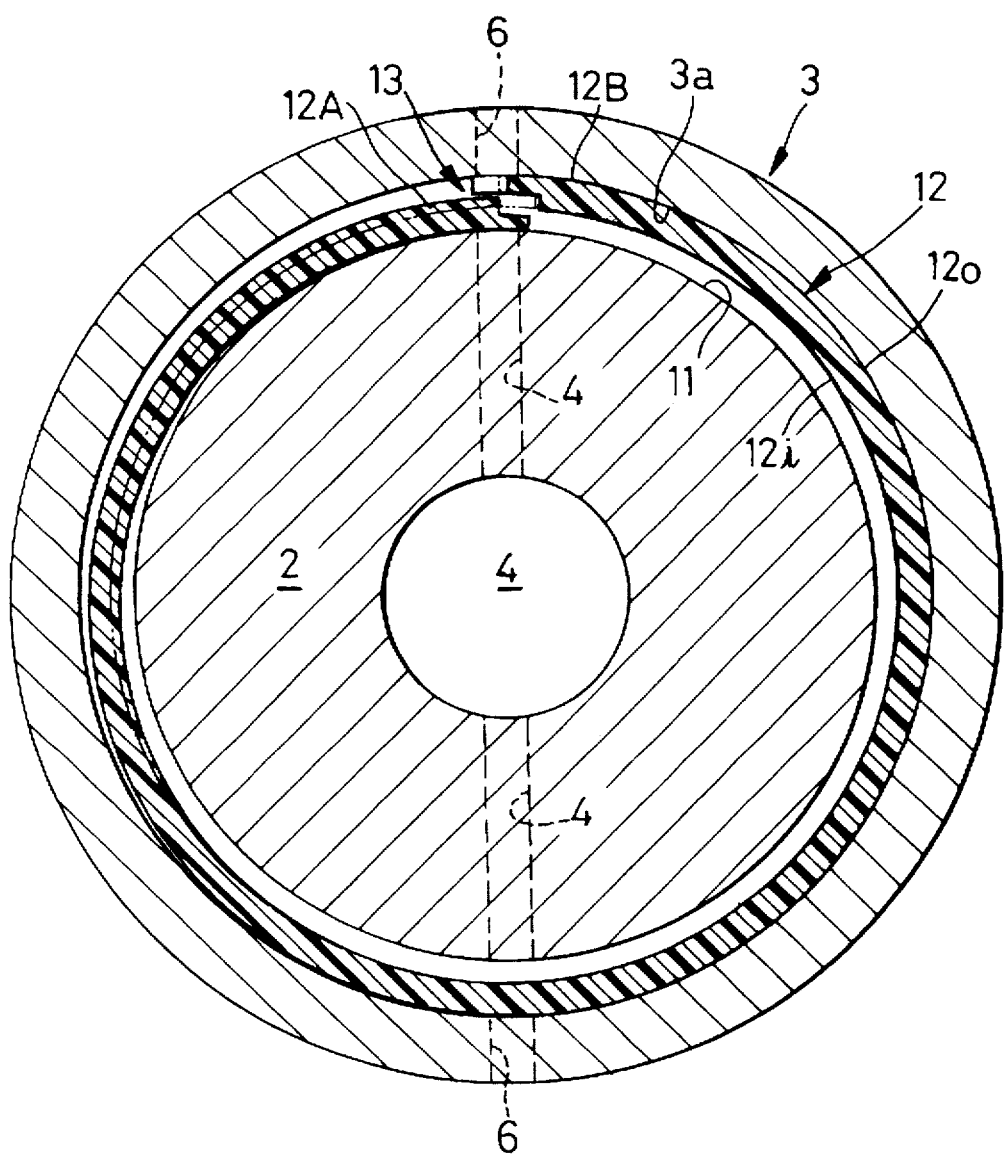
FIG. 2 is a sectional view taken along the line 2—2 in FIG. 1.

Referring first to FIGS. 1 and 2, a shaft member 2 is integrally provided on an inner wall of a stationary casing 1 to project therefrom. A housing 3 is rotatably fitted over an outer periphery of the shaft member 2, and a thrust bearing 9 is interposed between the casing 1 and the housing 3. The shaft member 2 constitutes a first member, and the housing 3 constitutes a second member in the present invention.

The shaft member 2 is provided with an oil passage 4, whose upstream portion is connected to a hydraulic pressure source through a control valve (both not shown), and whose downstream portion is communicates with an oil passage 6 in the housing 3 through an annular channel 5 provided around the outer periphery of the shaft member 2. The oil passage 6 is connected to an oil chamber 8 in a hydraulic actuator 7 such as a hydraulic clutch mounted in the housing 3. Thus, if a hydraulic pressure in the hydraulic source is supplied to the oil passage 4, such hydraulic pressure can be transferred through the annular channel 5 and the oil passage 6 to operate the hydraulic actuator 7.

A very small gap is provided between opposed peripheral surfaces of the shaft member 2 and the housing 3 for permitting the relative rotation of the shaft member 2 and the housing 3. A hydraulic sealing device 10 is mounted to prevent the hydraulic pressure, to the utmost, from being leaked from the annular channel 5 through the very small gap to the outside.

More specifically, a pair of seal ring grooves 11, 11 are formed around the outer periphery of the shaft member 2 and arranged on opposite sides of the annular channel 5, and seal rings 12, 12 are mounted in the seal ring grooves 11, 11. Each of the seal rings 12 has a single abutment joint 13, so that the seal ring 12 is mounted in the seal ring groove 11 by opening the abutment joint 13.

In the above description, each of the shaft member 2 and the housing 3 is made of iron, and the seal ring 12 is made of a synthetic resin having a predetermined elasticity. Examples of suitable synthetic resins are PES (polyester sulfon), PPS (polyphenylene sulfide), PEEK (polyether ether ketone), PI (polyimide), PAS (polyallyl sulfon) and the like, but particularly, a synthetic resin having a hardness $H_{RM}$ of 80 to 120, a tensile strength of 700 to 1800 kgf/cm² and a continuous heat resistance temperature of 180° C. or more is more appropriate.

Figure 3:
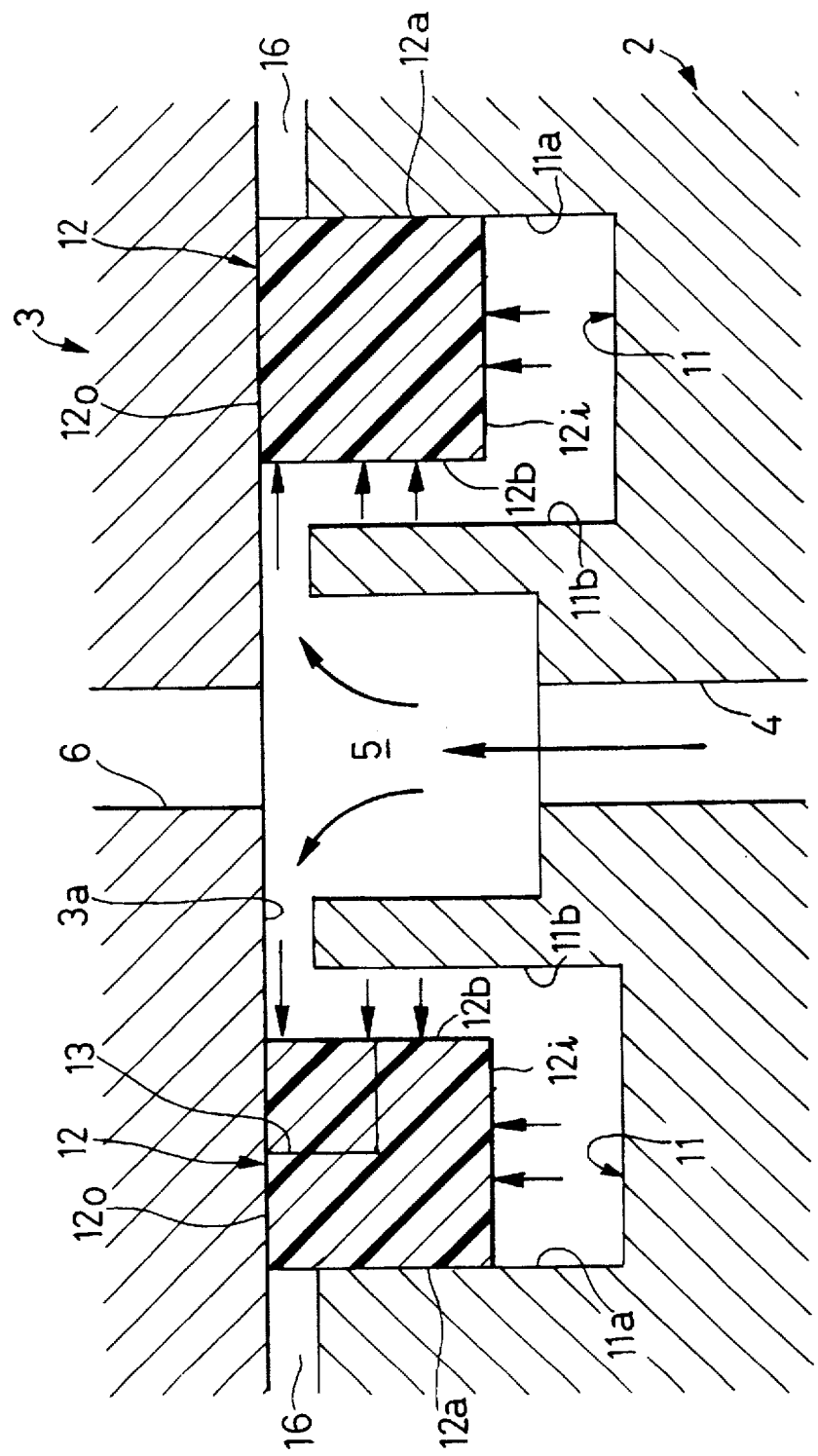
FIG. 3 is an enlarged view of a section indicated by 3 in FIG. 1.

Referring to FIGS. 2 and 3, axially opposite sides 11a and 11b of each of the seal ring grooves 11 are formed into flat faces. One side 11a of the sides 11a and 11b located at an outer location with respect to the annular channel 5 is called a sealing side of the seal ring groove 11, and the opposite side 11b is called a non-sealing side.

In the seal ring 12 made of the synthetic resin, its inner and outer peripheral surfaces 12i and 12o located respectively at radially inner and outer sides are formed into concentric cylindrical surfaces, and a pair of ring sides 12a and 12b located on radially opposite sides are formed into flat surfaces, respectively. Thus, the seal ring 12 assumes a quadrilateral cross-sectional shape.

Figure 4A:
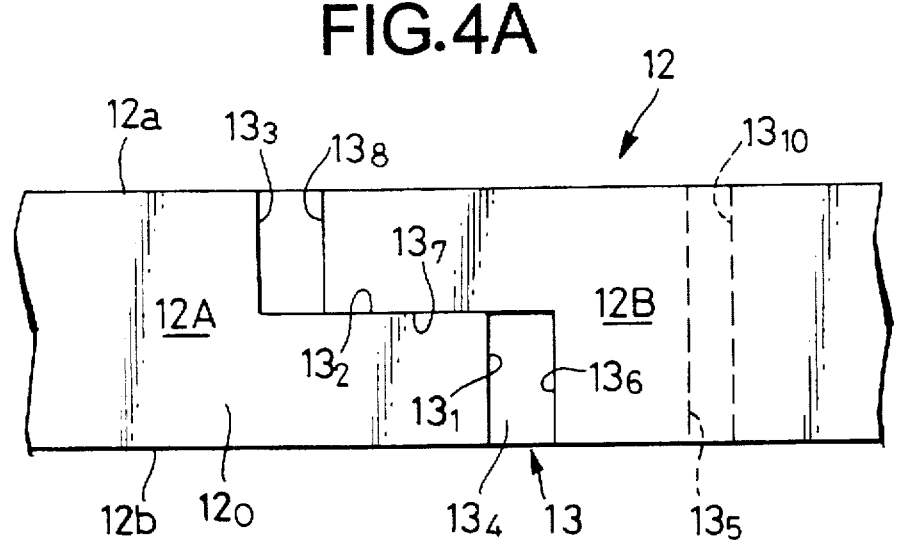
FIGS. 4A and 4B are views each illustrating an abutment joint of a seal ring (in a sealing state.
Figure 4B:
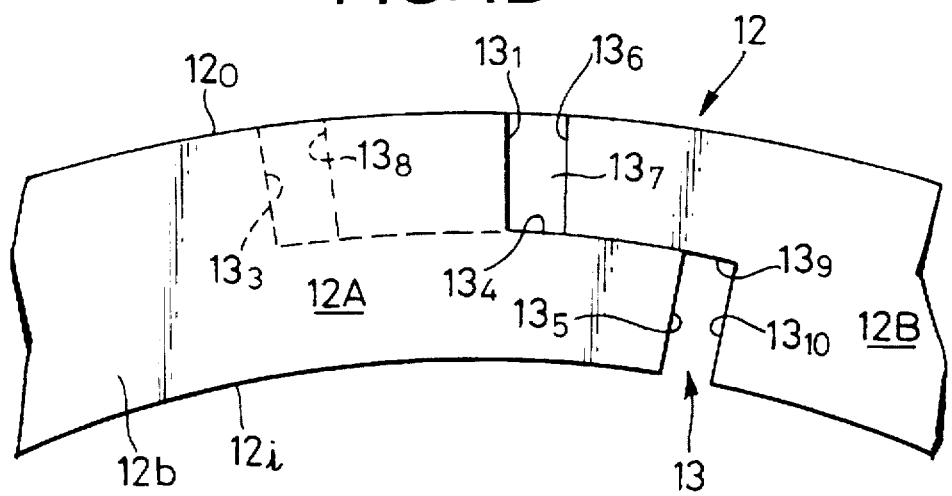

The shape of the abutment joint 13 formed in the seal ring 12 will be described below with reference to FIGS. 4A, 4B and 5.

Opposite ends 12A and 12B of the seal ring 12 are opposed to each other on opposite sides of the abutment joint 13. The one end 12A includes a first wall face $13_1$, a second wall face $13_2$, a third wall face $13_3$, a fourth wall face $13_4$ and a fifth wall face $13_5$, and the other end 12B includes a sixth wall face $13_6$, a seventh wall face $13_7$, an eighth wall face $13_8$, a ninth wall face $13_9$ and a tenth wall face $13_{10}$.

The fourth and ninth wall faces $13_4$ and $13_9$ extending axially and circumferentially are in close contact with each other, and the second and seventh wall faces $13_2$ and $13_7$ are in close contact with each other, so that they are circumferentially slid relative to each other by a thermal expansion and contraction of the seal ring 12 produced with a variation in temperature. In order to permit the thermal expansion of the seal ring 12 with the change in temperature, a small circumferential gap is provided between the first wall face $13_1$ and the sixth wall face $13_6$, between the third wall face $13_3$ and the eighth wall face $13_8$, and between the fifth wall face $13_5$ and the tenth wall face $13_{10}$, which extend axially and radially and are opposed to each other.

Figure 5:
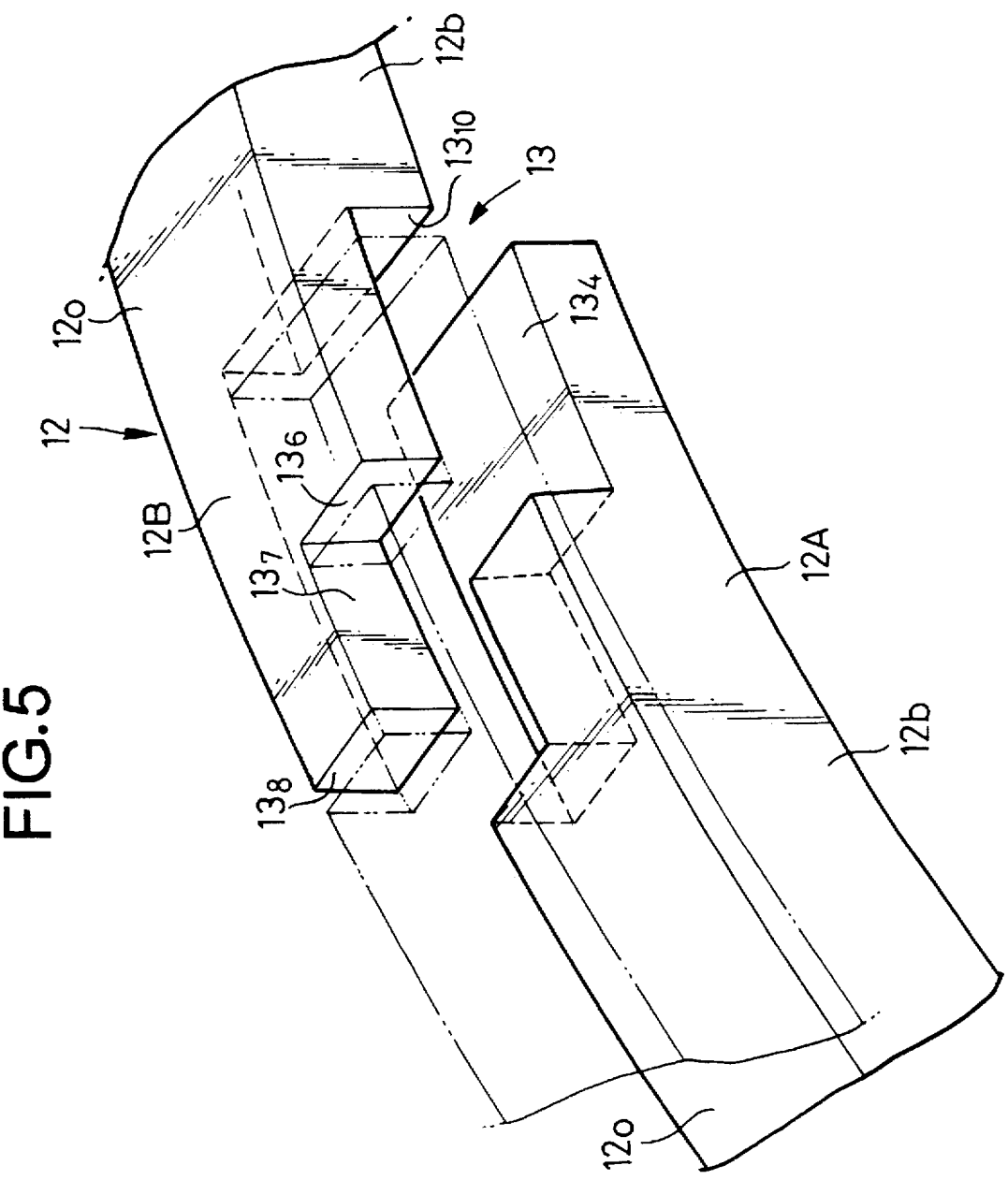
FIG. 5 is a perspective view illustrating the abutment joint of the seal ring (in a non-sealing state)

As can be seen from FIGS. 2 and 5, in a non-sealing state in which no hydraulic pressure is applied, the one end 12A of the sealing ring 12 is radially inwardly reduced in diameter more than the other end 12B and hence, the outer peripheral surface 12o of the seal ring 12 is not in close contact with a sealing inner peripheral surface 3a of the housing 3 in the vicinity of the one end 12A and is spaced from the sealing inner peripheral surface 3a at a predetermined gap left therebetween. In a sealing state in which a hydraulic pressure is applied to the inner peripheral surface of the seal ring 12, the one end 12A of the seal ring 12 is radially outwardly urged, so that the outer peripheral surface 12o of the seal ring 12 is in close contact with the sealing inner peripheral surface 3a of the housing 3.

The operation of the embodiment will be described below.

Referring to FIGS. 1 and 3, when the housing 3 is rotated relative to the shaft member 2, a hydraulic pressure of oil supplied from an oil pump and the hydraulic pressure generated by the centrifugal force are transferred to each of the seal ring grooves 11 and applied to the inner peripheral surface 12i of each of the seal rings 12 and other ring side 12b. This causes the outer peripheral surface 12o of the seal ring 12 to be brought into pressure contact with the sealing inner peripheral surface 3a of the housing 3, and causes the one ring side 12a to be brought into pressure contact with the sealing side 11a of the seal ring groove 11, while closing the abutment joint 13, thereby exhibiting a sealing effect. As a result, the oil is supplied via the annular channel 5 and the oil passage 6 to the oil chamber 8 in the actuator 7 to promptly bring the hydraulic actuator 7 into an engaged state.

In such a state, the friction torque generated between the outer peripheral surface 12o of each of the seal rings 12 and the sealing inner peripheral surface 3a of the housing 3 is larger than the friction torque generated between the ring side 12a of the seal ring 12 and the sealing side 11a of the seal ring groove 11 and hence, the seal ring 12 is rotated to follow the housing 3, so that a relative rotational sliding movement occurs between the ring side 12a and the sealing side 11a.

Now, when the hydraulic pressure is cut to release the engagement of the hydraulic actuator 7, the seal ring 12 which has been theretofore maintained in pressure contact with the sealing inner peripheral surface 3a of the housing 3 by the hydraulic pressure applied to the ring inner peripheral surface 12i, is moved away from the sealing inner peripheral surface 3a by radially inward shrinkage of the one end 12A by its own elasticity. As a result, the abutment joint 13 of the seal ring 12 is opened, as shown by solid lines in FIGS. 2 and 5, thereby permitting the oil returned from the oil chamber 8 in the actuator 7 to be discharged via the oil passage 6, the annular channel 5, the seal ring groove 11 and the abutment joint 13 of the seal ring 12 into a leak passage 16. This causes the engagement of the actuator 7 to be promptly released. Thus, in releasing the engagement of the actuator 7, a delay cannot be produced, thereby leading to an enhanced responsiveness.

Figure 6:
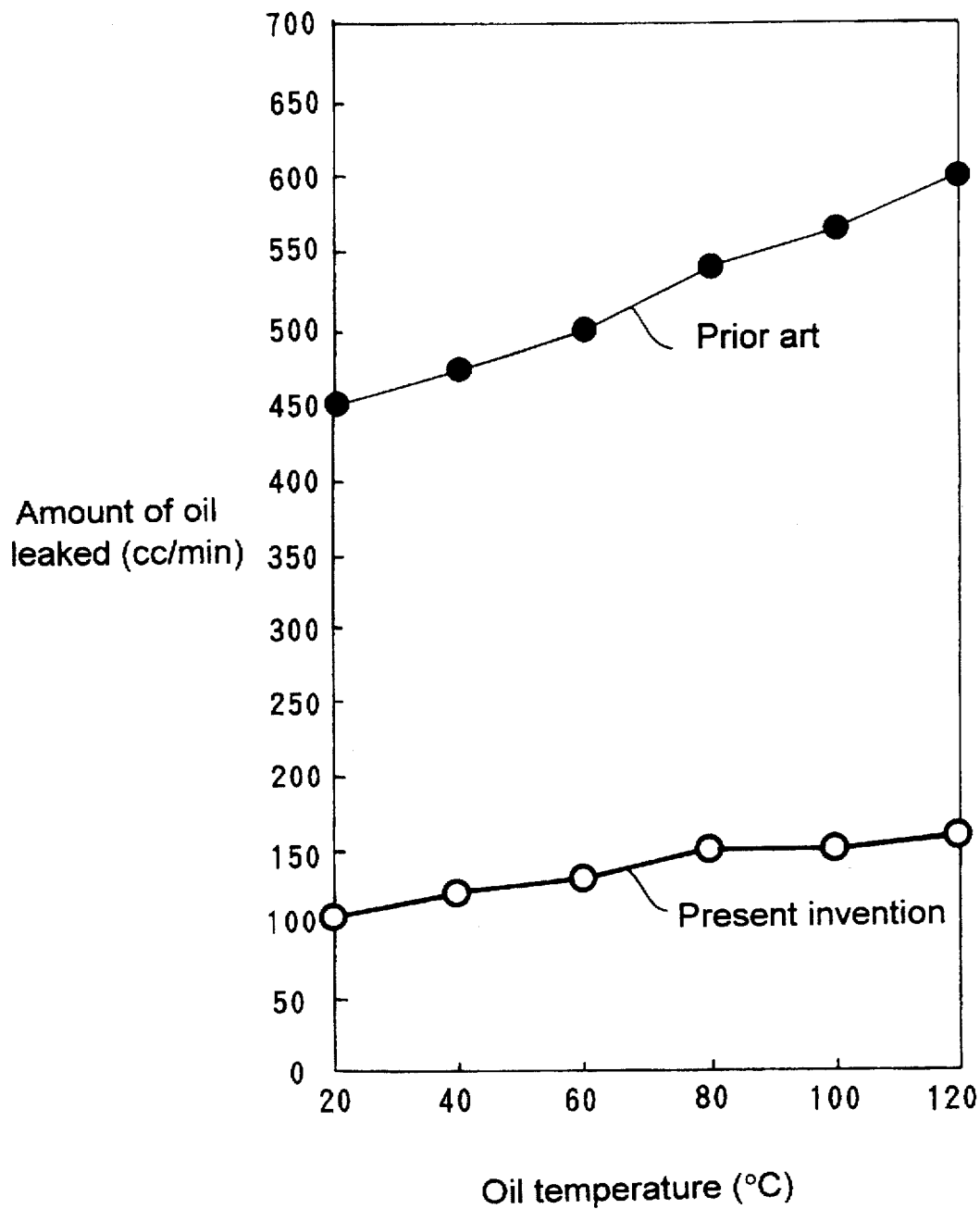
FIG. 6 is a graph illustrating the variation in amount of oil leaked with oil temperature.

FIG. 6 is a graph illustrating the amount of oil leaked from the seal ring during release of actuator 7, which leaked oil was measured at various oil temperatures, as compared to the prior art seal ring. In conducting the sealing, the seal ring 12 of the present invention is completely closed by the close contact between the fourth wall face $13_4$ and the ninth wall face $13_9$ and the close contact between the second wall face $13_2$ and the seventh wall face $13_7$ and hence, the amount of oil leaked is extremely small at any of the oil temperatures.

Figure 7:
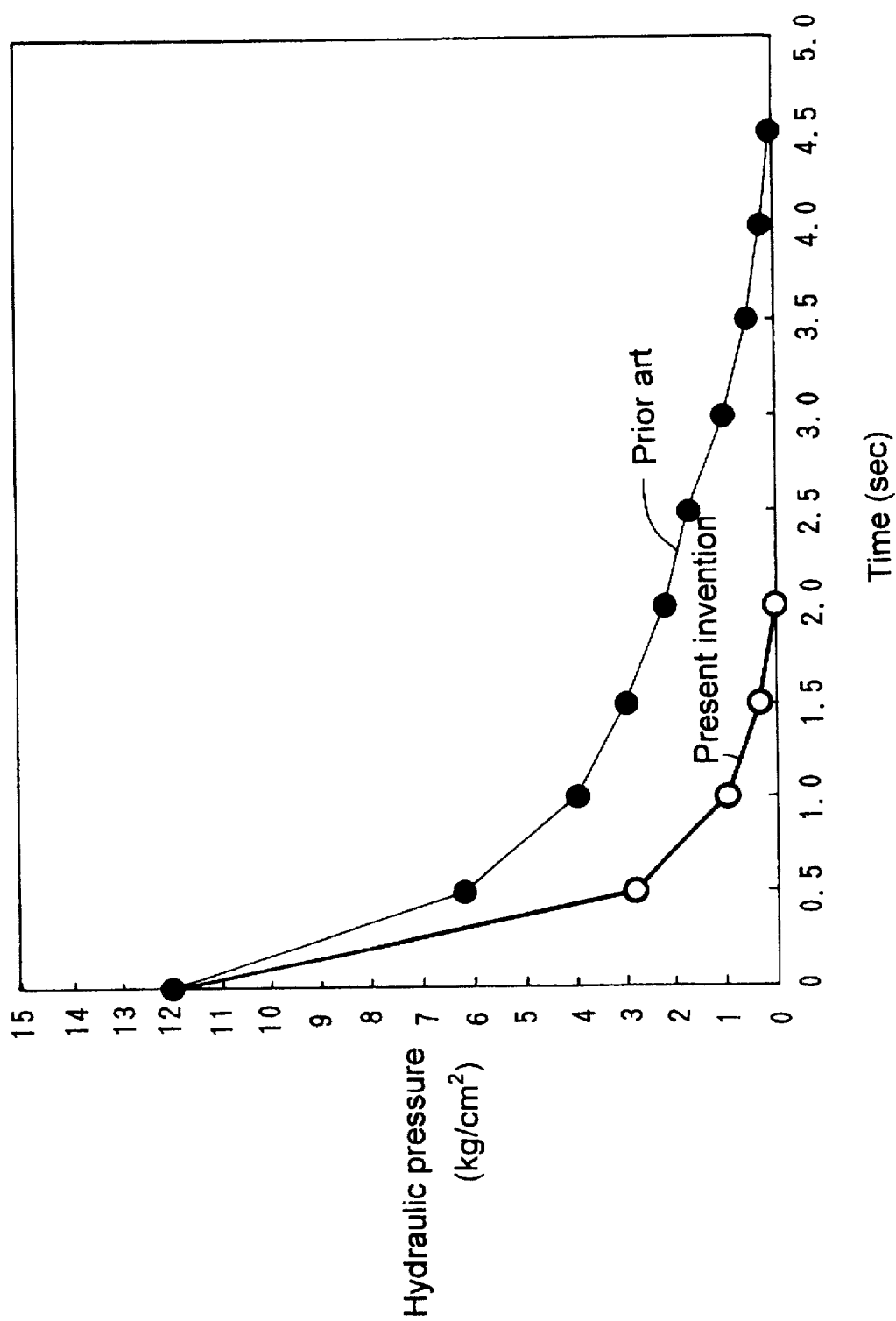
FIG. 7 is a graph illustrating the variation in hydraulic pressure with time.

FIG. 7 illustrate the variation in hydraulic pressure in the oil chamber 8 from the moment when the hydraulic pressure is cut in order to release the engagement of the actuator 7. In the known prior art seal ring, about 4.5 seconds are required for the hydraulic pressure to be completely dropped, whereas in the seal ring according to the present invention, the hydraulic pressure can be completely dropped in about 2 seconds by radially inward shrinkage of the one end 12A to open the abutment joint 13 for non-sealing.

Figure 8:
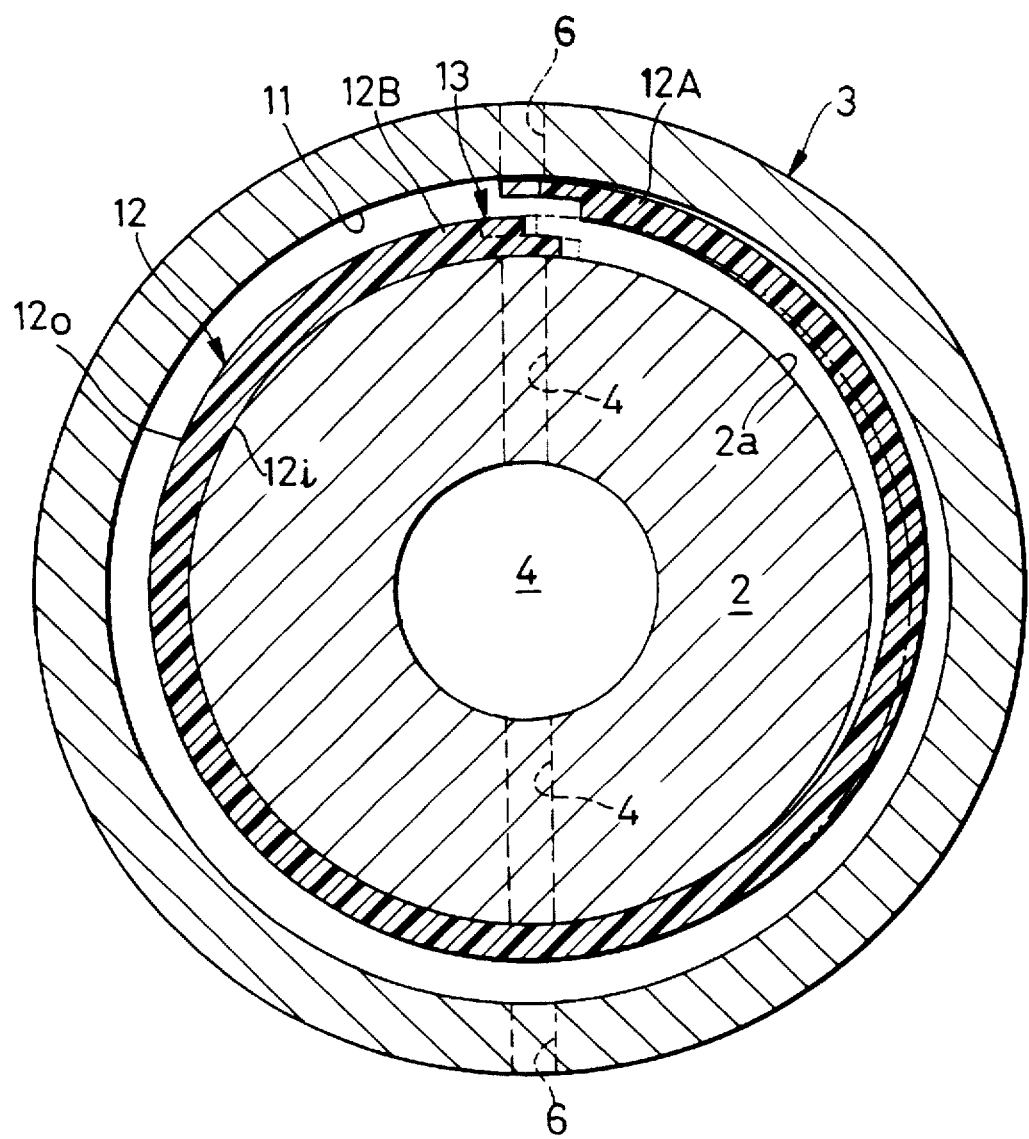
FIG. 8 is a sectional view similar to FIG. 2, but according to a second embodiment of the present invention.
Figure 9:
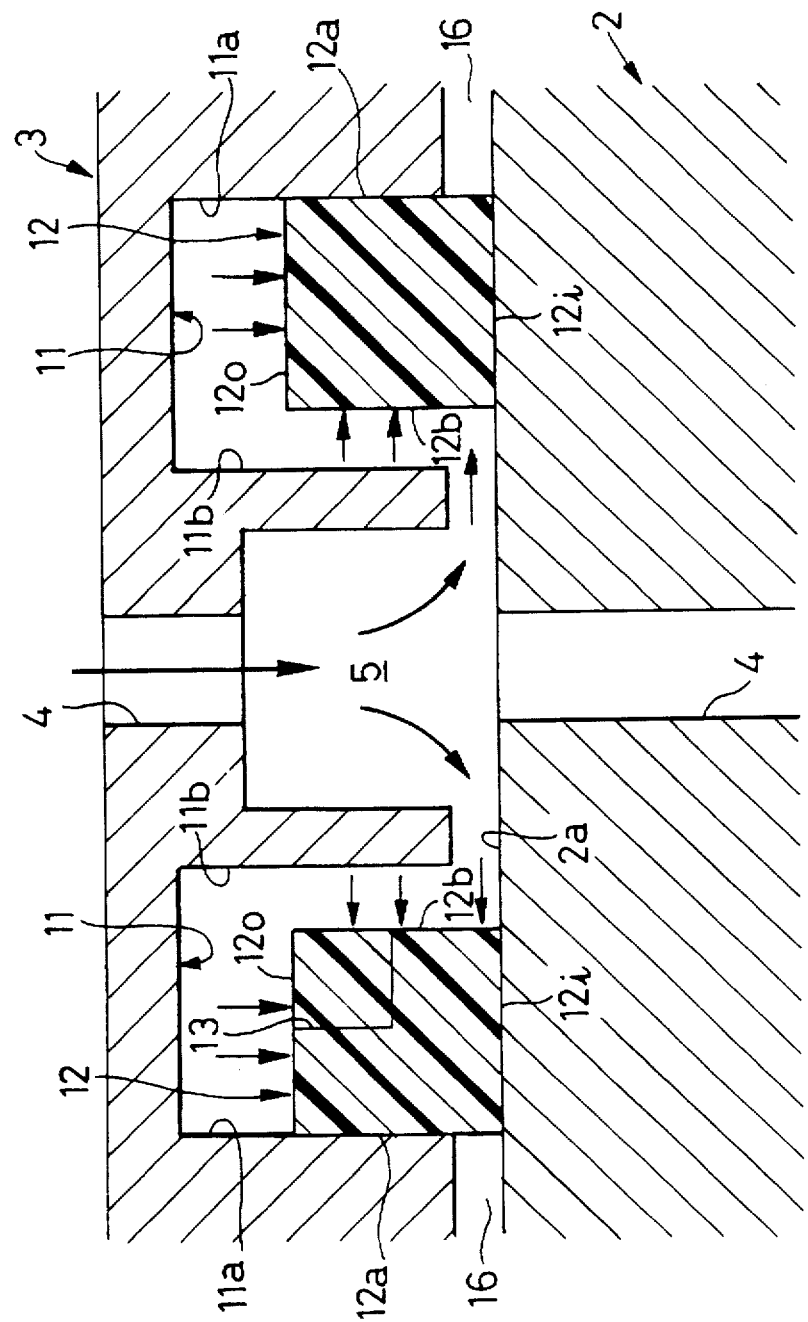
FIG. 9 is a view similar to FIG. 3, but according to the second embodiment of the present invention.

A second embodiment of the present invention will now be described with reference to FIGS. 8 and 9.

In the above-described first embodiment, the housing 3 is rotatably fitted over the outer periphery of the stationary shaft member 2, and the seal ring 12 is mounted in the seal ring groove 11 formed around the outer periphery of the shaft member 2. In the second embodiment, however, a shaft member 2 is rotatably carried in a stationary housing 3, and a seal ring 12 is mounted in a seal ring groove 11 formed in an inner periphery of the housing 3. As in the first embodiment, each of the shaft member 2 and the housing 3 in the second embodiment is made of iron, and the seal ring 12 is made of a synthetic resin.

An abutment joint 13 of the seal ring 12 has the same shape as in the first embodiment. However, for non-sealing in which no hydraulic pressure is applied to the ring outer peripheral surface 12o, an end 12A of the seal ring 12 is radially outwardly expanded by its own elasticity, so that the ring inner peripheral surface 12i is moved away from a sealing face 2a of the shaft member 2 (see FIG. 8). Therefore, when the operation of the hydraulic actuator 7 is released, the abutment joint 13 of the seal ring 12 can be opened to permit the hydraulic pressure to escape to the leak passage 16, thereby preventing a delay in the hydraulic actuator 7 to enhance the responsiveness in the releasing operation.

When the hydraulic pressure of an oil supplied from the oil pump is transferred to the seal ring groove 11 and applied to the outer peripheral surface 12o and the other ring side 12b of the seal ring 12, the end 12B of the seal ring 12 is urged in the radially inward direction, so that the inner peripheral surface 12i is brought into pressure contact with the sealing outer peripheral surface 2a of the shaft member 2, while the one ring side 12a is brought into pressure contact with the sealing side 11a of the seal ring groove 11, and further, the abutment joint 13 is closed, thereby exhibiting a sealing effect. Therefore, the hydraulic actuator 7 can be promptly brought into an engaged state.

Even with the second embodiment, a functional effect similar to that in the previously described first embodiment can be provided.

A third embodiment of the present invention will now be described with reference to FIGS. 10 to 13.

In the third embodiment, a housing 3 is rotatably fitted over an outer periphery of a stationary shaft member 2, so that the shaft member 2 and the housing 3 are sealed from each other by a seal ring 12 made of a synthetic resin and mounted in a seal ring groove 11 formed around an outer periphery of the shaft member 2, as in the first embodiment. However, the shaft member 2 in the third embodiment is made of an aluminum alloy that is liable to be worn substantial more than iron and for this reason, a special design is provided for the shape of the abutment joint 13 of the seal ring 12.

Figure 11:
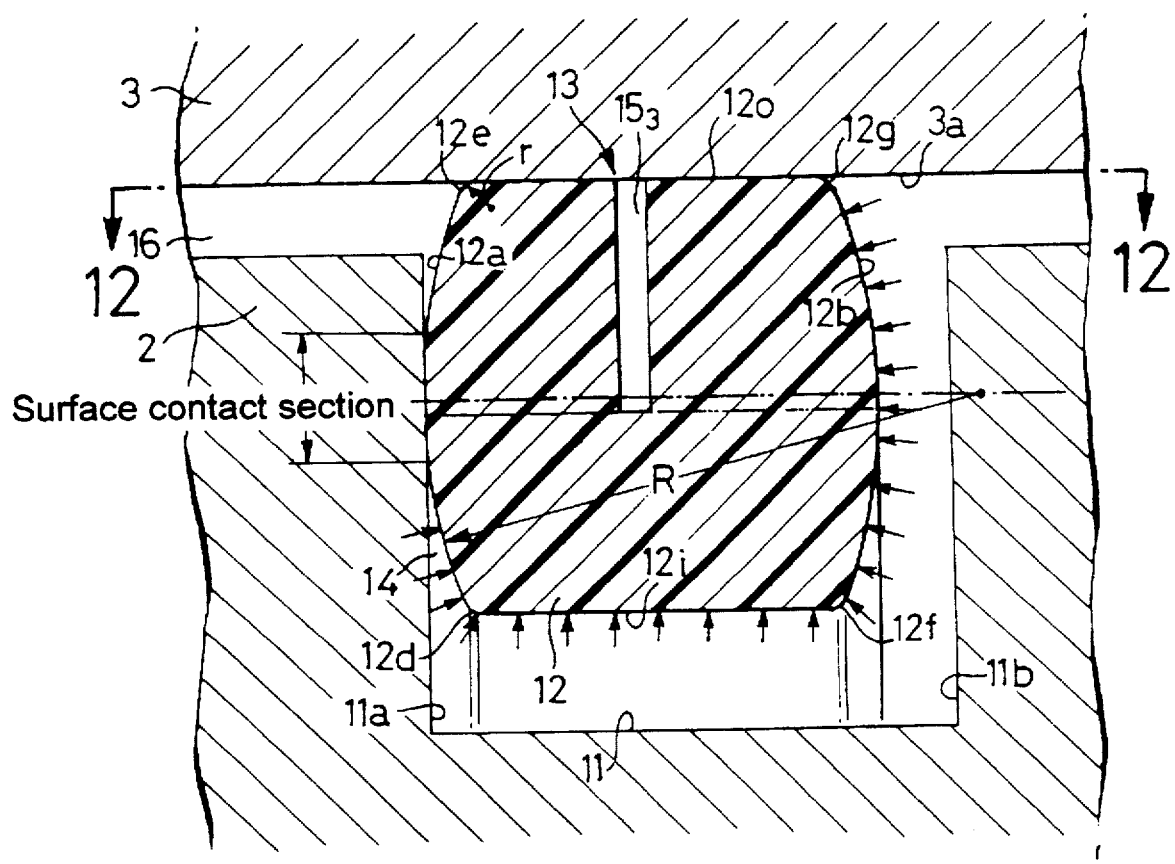
FIG. 11 is an enlarged view of a sealing area (a sectional view taken along the line 11—11 in FIG. 12) of the third embodiment.

As shown in FIG. 11, each of the pair of sealing sides located on the axially opposite sides of the seal ring 12 made of the synthetic resin is crowned into a convex curved surface having a radially raised central portion, whereby the seal ring 12 has a cask-like cross-sectional shape. The radius of curvature of the convex curved surface is set in a range of 3 to 130 mm, preferably at substantially 11 mm. The corners 12d, 12e, 12f and 12g at which the inner and outer peripheral surfaces 12i and 12o and the opposite sides 12a and 12b of the seal ring 12 intersect respectively with each other, are rounded.

Figure 10:
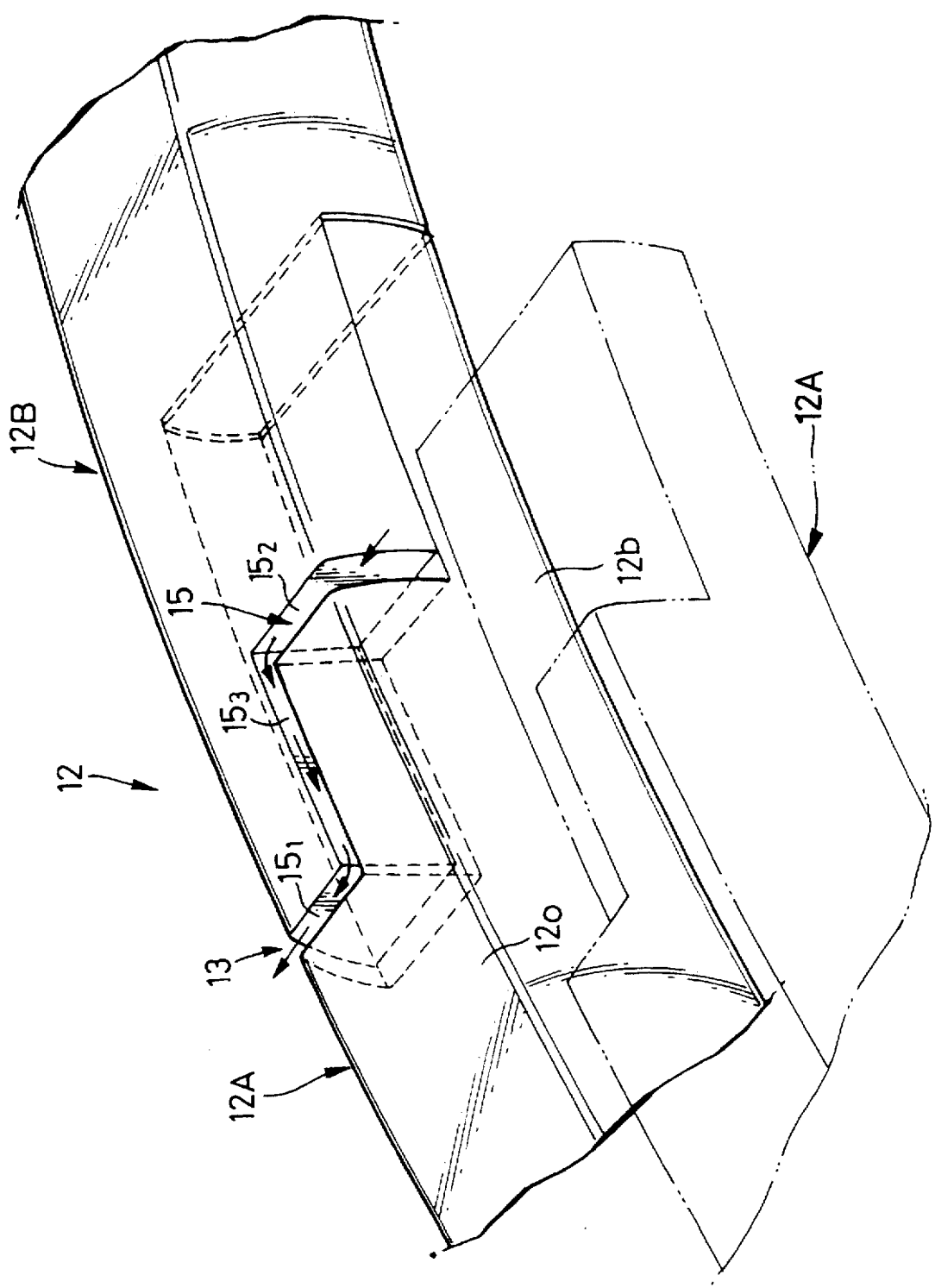
FIG. 10 is a perspective view of an abutment joint of a seal ring according to a third embodiment of the present invention (in a sealing state)
Figure 12:
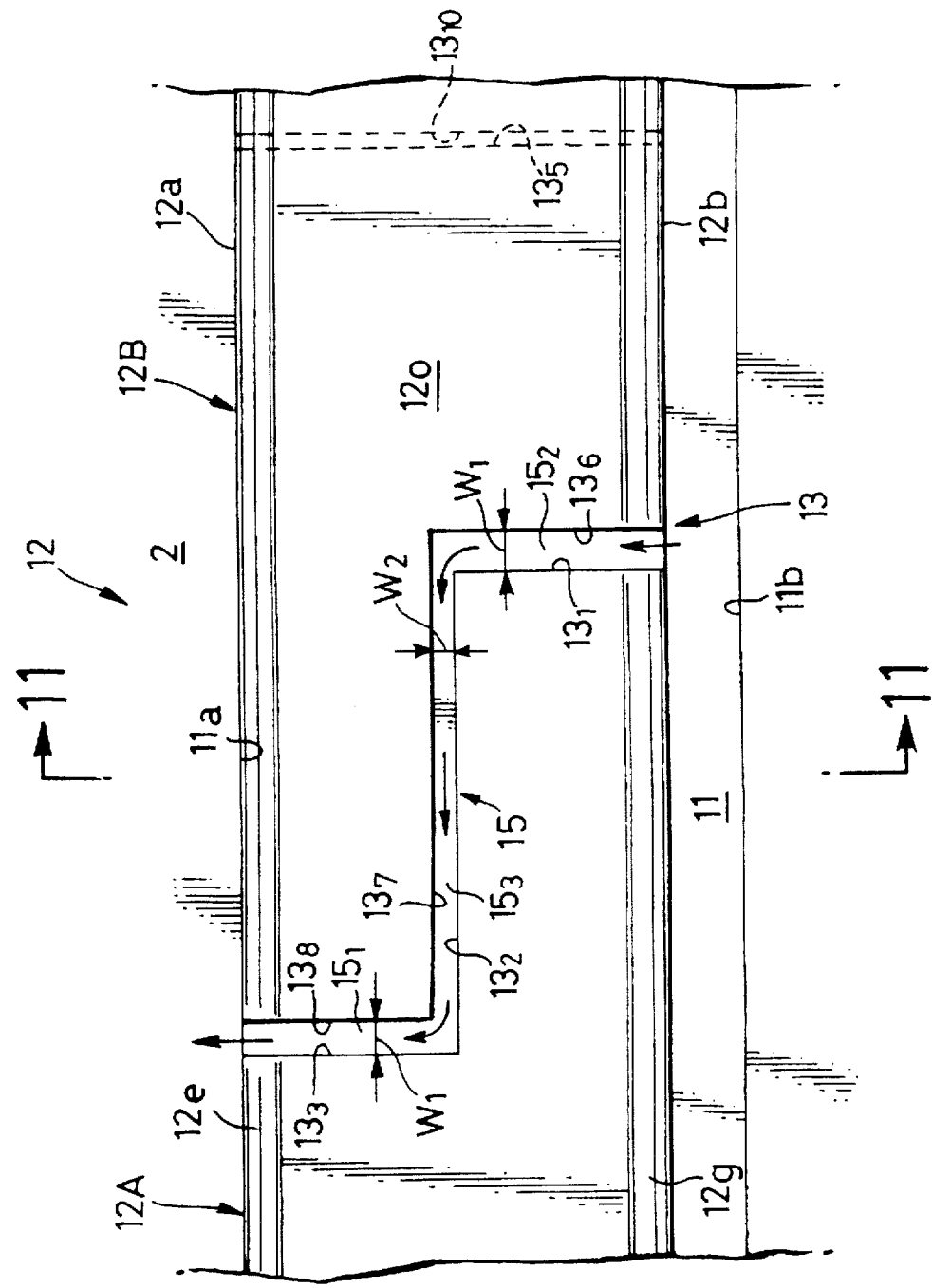
FIG. 12 is a view taken along the line 12—12 in FIG. 11.

As shown in FIGS. 10 and 12, the shape of the abutment joint 13 is similar to that of the seal ring in the first embodiment, but in this third embodiment, a crank-shaped oil channel 15 is formed in the abutment joint 13 of the seal ring 12 to face the outer peripheral surface 12o of the seal ring 12. In other words, the first, second and third wall faces $13_1$, $13_2$ and $13_3$ are formed into a crank shape, and constitute the crank-shaped oil channel 15 by cooperation with and spacing from the sixth, seventh and eighth wall faces $13_6$, $13_7$ and $13_8$ which are likewise formed into a crank shape. The crank-shaped oil channel 15 is comprised of a pair of first and second oil channel portions $15_1$ and $15_2$ extending axially and opening into the opposite ring sides 12a and 12b, respectively, and a third oil channel portion $15_3$ extending circumferentially and connected to the first and second oil channel portions $15_1$ and $15_2$.

The second oil channel portion $15_2$ between the first and sixth wall faces $13_1$ and $13_6$ and the first oil channel portion $15_1$ between the third and eighth wall faces $13_3$ and $13_8$ each has a relatively large circumferential width $W_1$ (about 1 mm), which is decreased but not eliminated by the thermal expansion of the seal ring 12 generated with an increase in temperature. On the other hand, the third oil channel portion $15_3$ between the second and seventh wall faces $13_2$ and $13_7$ has a relatively small axial width $W_2$ (about 50 to 100 μm) because its size is relatively unaffected by temperature change. In the Figures, the axial width $W_2$ of the third oil channel portion $15_3$ is exaggeratively drawn or indicated wider than the actual width for clarity of illustration. The axial width $W_2$ of the third oil channel portion $15_3$ remains substantially constant irrespective of the variation in temperature of the seal ring 12.

As can be seen from FIG. 10, the seal ring 12 is radially reduced in diameter at its one end 12A (shown by a dashed line in FIG. 10), as in the first embodiment and thus, for non-sealing, the abutment joint 13 is opened to permit the hydraulic pressure to be escaped and to promptly release the engagement of the hydraulic actuator 7, and in conducting the sealing, the abutment joint 13 is closed by the hydraulic pressure, thereby preventing most of the leakage of the oil and providing a prompt engagement of the hydraulic actuator 7.

As can be seen from FIG. 11, a gap 14 is produced radially inside a pressure contact section between the sealing side 11a in the form of the flat surface and the ring side 12a in the form of the convex curved surface, and the oil entering the gap 14 intends to advance in a direction inclined at a certain angle in the direction of rotation of the seal ring 12 from a radial line within the gap 14 by the rotational force and the centrifugal force received from the seal ring 12, i.e., the oil tends to advance just as a wedge having an angle more acute than that of the apex of the triangular gap and enters into the gap between the sealing side 11a and the ring side 12a. Thus, such a wedge effect of the oil promotes the formation of an oil film at a contact section between the sealing side 11a and the ring side 12a.

In addition, the seal ring 12 made of the synthetic resin has a predetermined elasticity and hence, when the one ring side 12a in the form of the convex curved surface is urged against the sealing side 11a in the form of the flat surface by the hydraulic pressure received on the other sealing side 12b, a portion of the sealing side 12a is compressed and deformed into the form of a flat surface to come into surface contact with the sealing side 11a. Thus, the contact pressure can be reduced by an increase in contact area, thereby further satisfactorily achieving the formation and maintaining of the oil film between the sealing side 11a and the ring side 12a.

Figure 13:
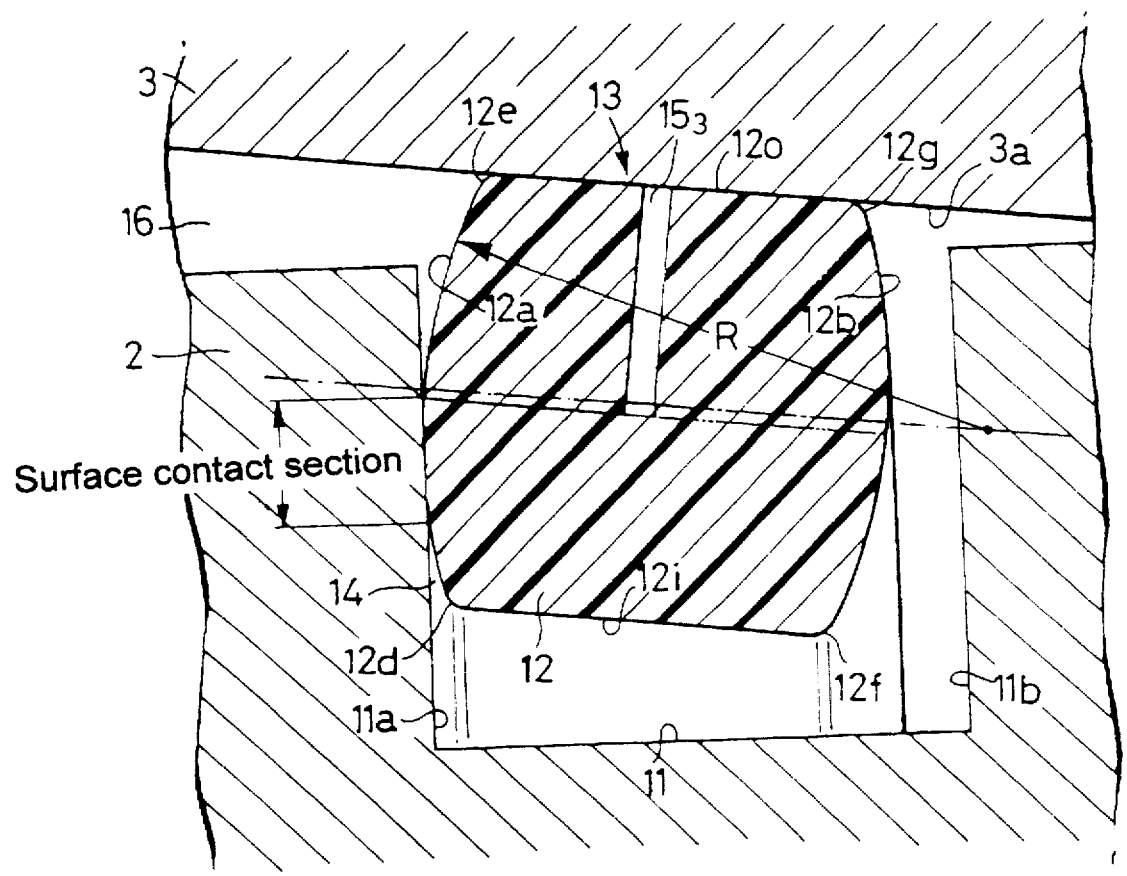
FIG. 13 is a view similar to FIG. 11 for explaining the function.
Figure 14:
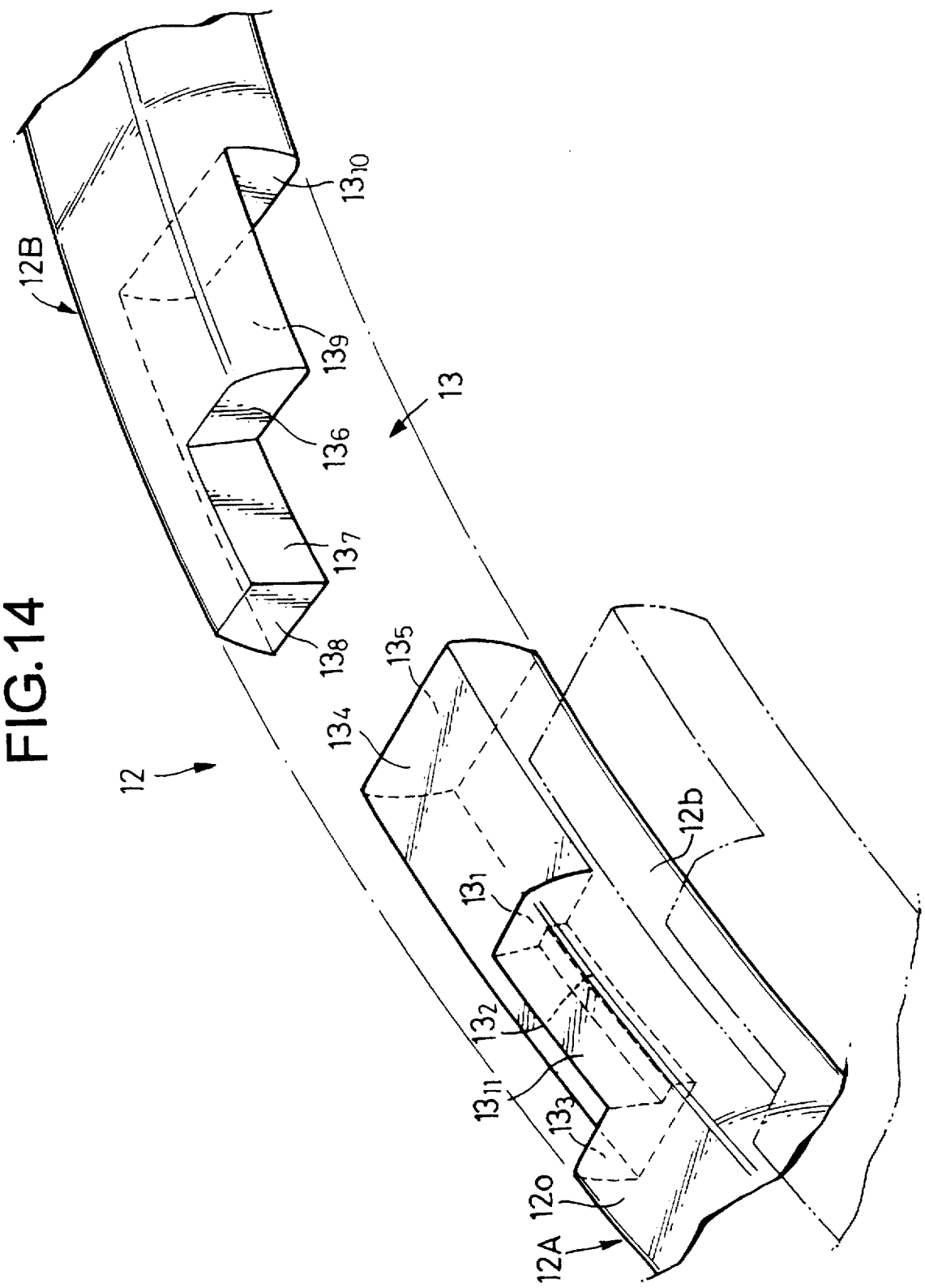
FIG. 14 is an exploded perspective view of an abutment joint of a seal ring according to a fourth embodiment of the present invention.
Figure 15:
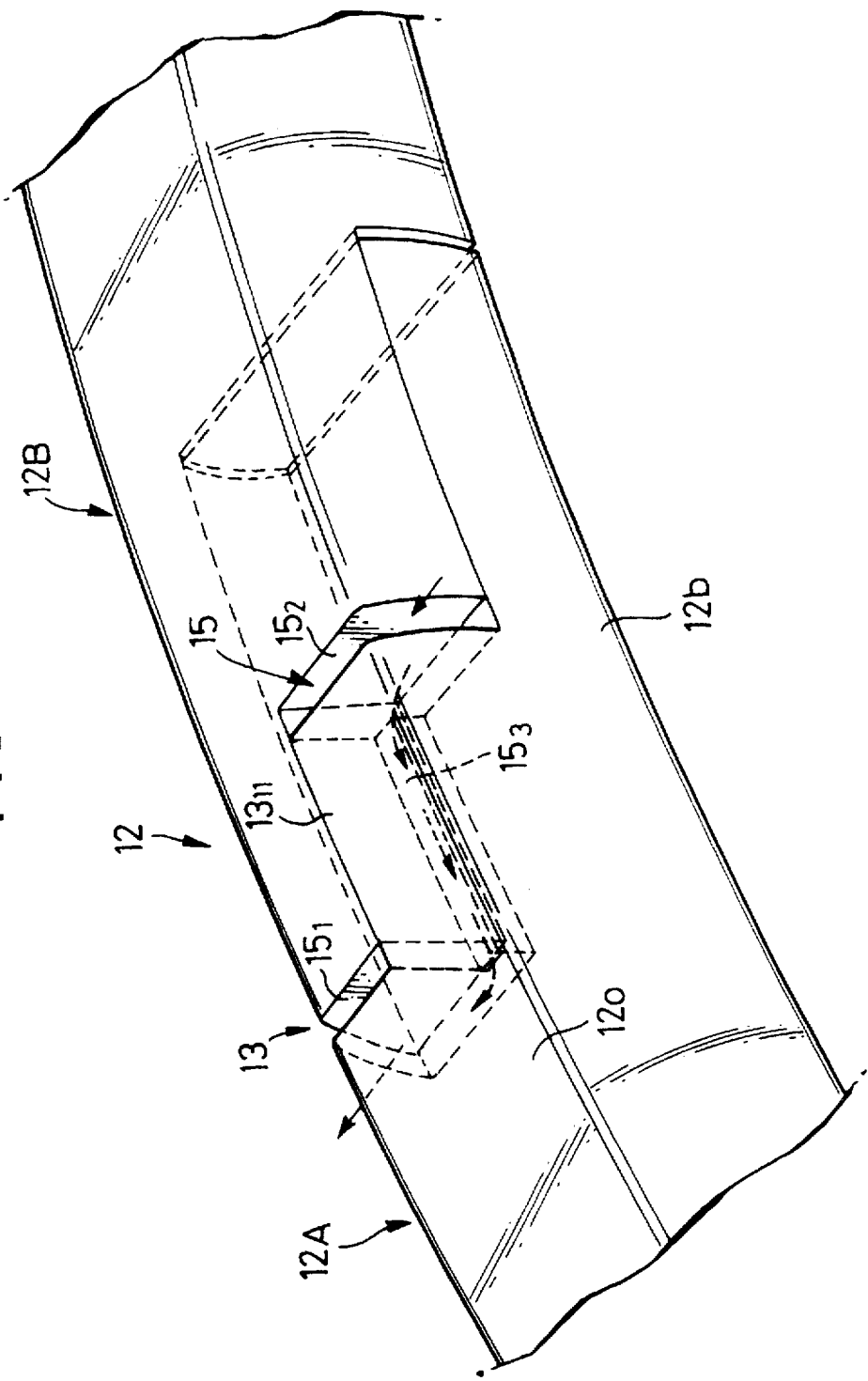
FIG. 15 is a perspective view of the abutment joint of the seal ring (in a sealing state) of the fourth embodiment.
Figure 16:
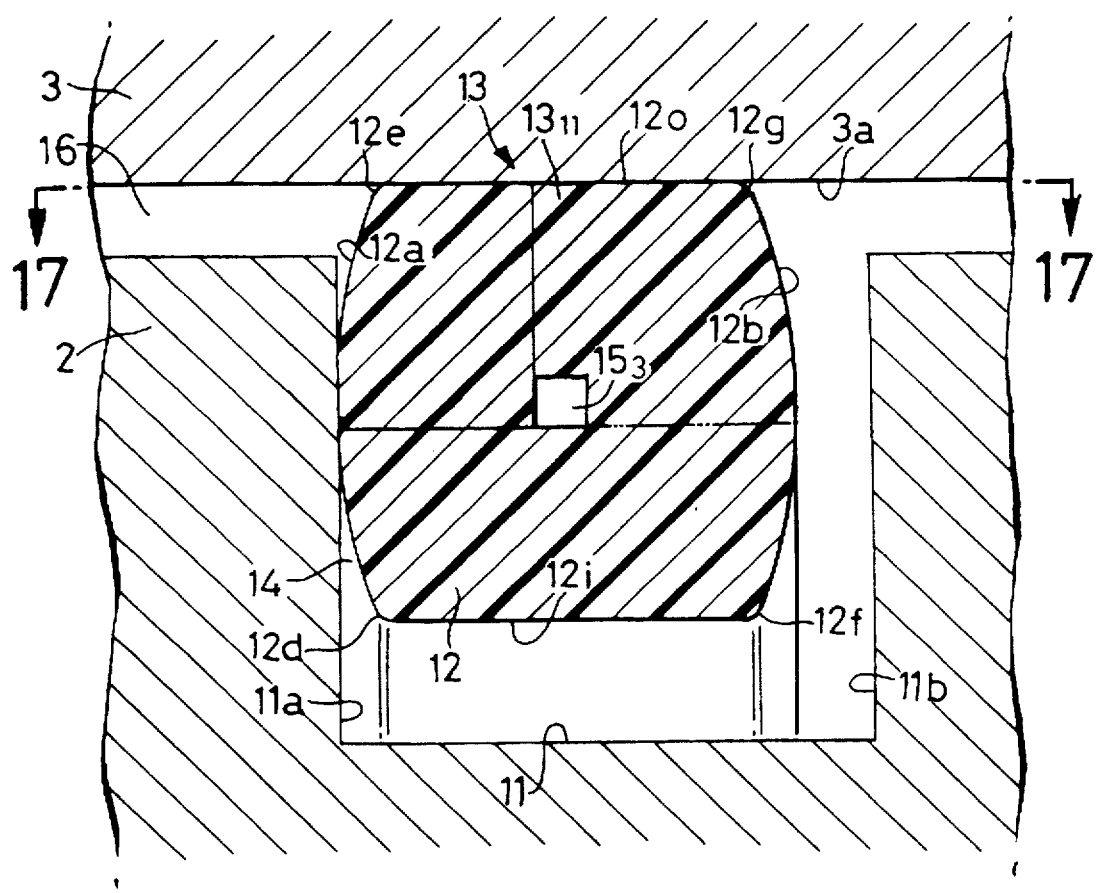
FIG. 16 is a sectional view of a sealing area (a sectional view taken along the line 16—16 in FIG. 17) of the fourth embodiment.

Then, if the shaft member 2 and the housing 3 are inclined from each other for any reason, as shown in FIG. 13, the seal ring 12 produces a torsional deformation to follow the inclination under the hydraulic pressure received on the inner peripheral surface 12i of the seal ring 12, so that a gap-less surface contact of the outer peripheral surface 12o of the seal ring 12 with the sealing inner peripheral surface 3a of the housing 3 is maintained and hence, an outer peripheral sealing function can be continued to be normally exhibited. Following the torsional deformation, the contact section of the ring side 12a in the form of the convex curved surface is only changed relative to the sealing side 11a in the form of the flat surface, and the state of surface contact of the ring side 12a with the sealing side 11a is not changed, whereby the side sealing function can be continued to be normally exhibited.

Further, if the inclination of the shaft member 2 and the housing 3 relative to each other is excessive, the corners 12d and 12e at which the ring side 12a and the ring inner and outer peripheral surfaces 12i and 12o intersect are brought into contact with the sealing side 11a of the seal ring groove 11. However, such contact is not an edge contact, because the corners 12d and 12e are rounded. Therefore, the corners 12d and 12e can be smoothly turned and slid on the flat sealing side 11a without cutting the oil film.

In a condition in which the seal ring 12 has been mounted in the seal ring groove 11, a portion of the oil within the seal ring groove 11 is continually leaked into a leak oil passage 16 (see FIG. 11) formed between the outer peripheral surface of the shaft member 2 and the sealing inner peripheral surface 3a of the housing 3 through the crank-shaped oil channel 15 formed in the seal ring 12, to enhance the lubrication between the seal ring 12 and sealing side 11a so that wearing of the sealing side 11a of the seal ring groove 11 formed in the shaft member 2 made of the aluminum alloy can be prevented by such leaked oil.

Specifically, even with a supply of oil after filtering by an oil filter, it is unavoidable that a hard foreign matter such as an iron powder having a particle size of 300 μm or less is incorporated into such oil, and if the oil containing the foreign matter leaks between the ring side 12a of the seal ring 12 and the sealing side 11a of the seal ring groove 11, the hard foreign matter sticks in the ring side 12a of the seal ring 12 to wear the sealing side 11a made of the aluminum alloy.

However, the crank-shaped oil channel 15 has a minimum width of about 50 to 100 μm at the third oil channel portion $15_3$ and, for this reason, foreign matter having a small particle size on the order of 20 to 100 μm can leak along with the oil through the crank-shaped oil channel 15 and, as a result, the wearing of the sealing side 11a made of the aluminum alloy is prevented. Even if foreign matter having a particle size larger than 50 μm has clogged an inlet of the third oil channel portion $15_3$, the clogging foreign matter, when the abutment joint 13 has been opened for non-sealing of the seal ring 12, leaks out quickly along with the oil through the opened abutment joint 13 and, as a result, the wearing of the sealing side 11a made of the aluminum alloy is prevented.

If the axial width $W_2$ of the third oil channel portion $15_3$ of the crank-shaped oil channel 15 is set at 300 μm or more, the foreign matter would be permitted to flow therethrough without waiting for the opening of the abutment joint 13. However, if the axial width $W_2$ of the third oil channel portion $15_3$ is set at such a large value, the amount of oil leaked, when the hydraulic pressure is of the normal value of 12 kg/cm$^2$, reaches a value in a range of 400 to 600 cc/min, resulting not only in a problem of a reduced responsiveness during the engagement of the hydraulic actuator 7, but also in a problem of a reduced efficiency by the leakage of the oil. However, if the seal ring in the present embodiment is employed, the wearing of the shaft member 2 made of the aluminum alloy by the foreign matter can be reliably avoided by the axial width $W_2$ of the third oil channel portion $15_3$ being set in a range of about 50 to 100 μm to suppress the amount of oil leaked to a range of 100 to 150 cc/min which offers no problem in practical use.

If the seal ring 12 is thermally expanded or thermally shrunk circumferentially due to a variation in temperature, the circumferential width $W_1$ of each of the first and second oil channel portions $15_1$ and $15_2$ of the crank-shaped oil channel 15 is changed, but the axial width $W_2$ of the third oil channel portion $15_3$ is kept constant despite the variation in temperature. Therefore, the amount of oil leaked through the third oil channel portion $15_3$ can be maintained constant. In addition, since the crank-shaped oil channel 15 is formed only on the side of the outer peripheral surface 12o of the seal ring 12 in sliding contact with the sealing inner peripheral surface 3a of the housing 3, the opening of the first oil channel portion 15₁ of the crank-shaped oil channel 15 facing the surface contact section (see FIG. 11) of the seal ring groove 11 can be made small, thereby avoiding, to the utmost, the wearing of the sealing side 11a caused by any foreign matter contained in the oil passed through the opening.

A fourth embodiment of the present invention will now be described with reference to FIGS. 14 to 17.

In a seal ring 12 in the fourth embodiment, a third oil channel portion 15₃ of a crank-shaped oil channel 15 does not open into the ring outer peripheral surface 12o, as in the third embodiment, but rather is closed in a tunnel-like configuration by a closing wall 13₁₁ which is flush with and extends inwardly from the ring outer peripheral surface 12o. As a result, the third oil channel portion 15₃ has a quadrilateral sectional shape of about 50 to 100 μm×50 to 100 μm. Other shapes and structures of the seal ring 12 are identical to those in the third embodiment. Alternatively, in place of the closing wall 13₁₁ being provided on the side of the second wall face 13₂ as in the described and illustrated embodiment, a closing wall 13₁₁ may be provided on the side of the seventh wall face 13₇.

Figure 17:
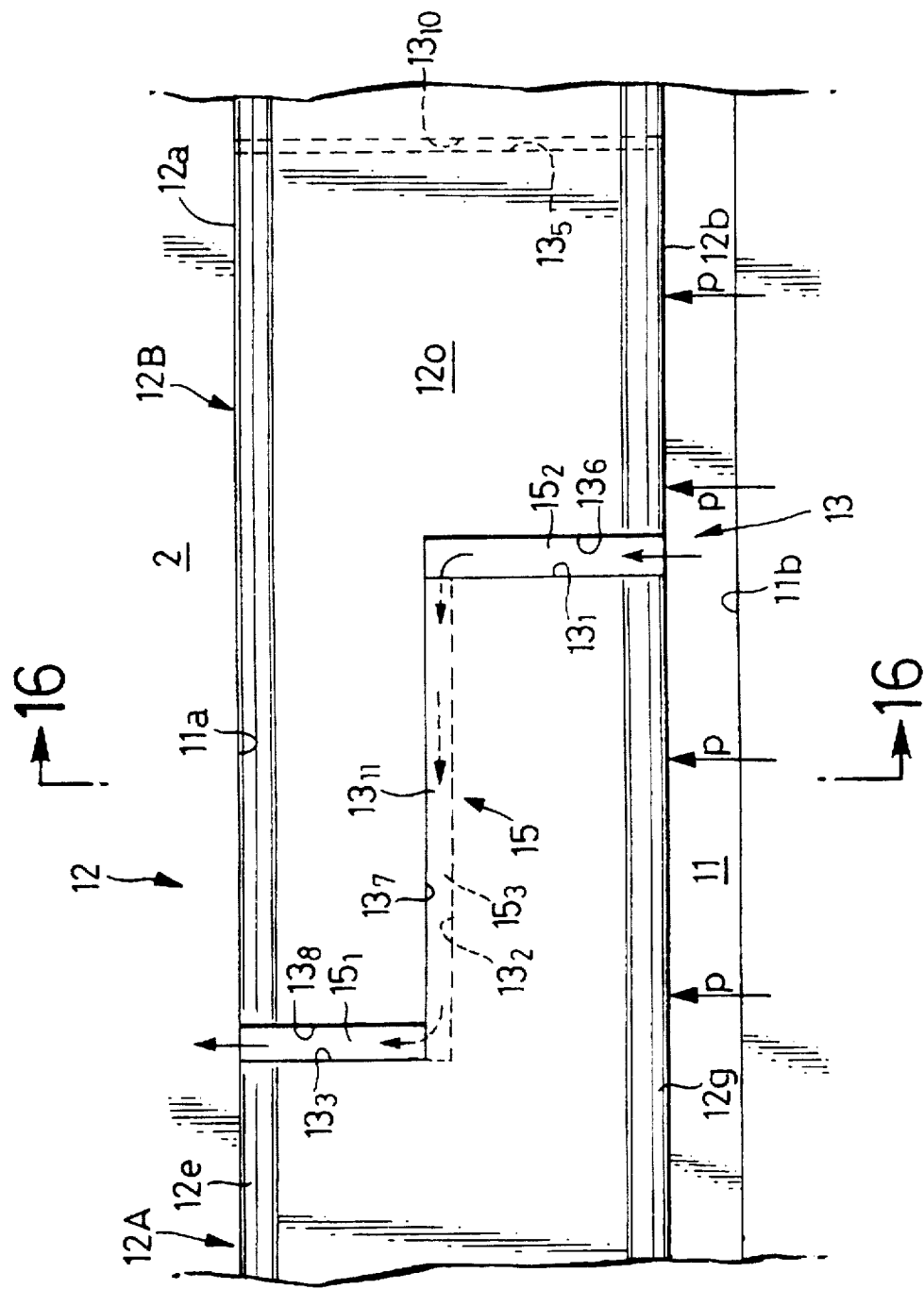
FIG. 17 is a view taken along the line 17—17 in FIG. 16.

In the fourth embodiment, in addition to the function and effect of the third embodiment, when the hydraulic pressure is applied to the other ring side 12b of the seal ring 12 as shown by the arrows p in FIG. 17, the width of the third oil channel portion 15₃ of the crank-shaped oil channel 15 is prevented from being reduced by supporting the load resulting from the application of such hydraulic pressure by the closing wall 13₁₁. Therefore, the fourth embodiment is effective for use particularly under a high pressure.

A fifth embodiment of the present invention will now be described with reference to FIGS. 18 to 20.

Figure 18:
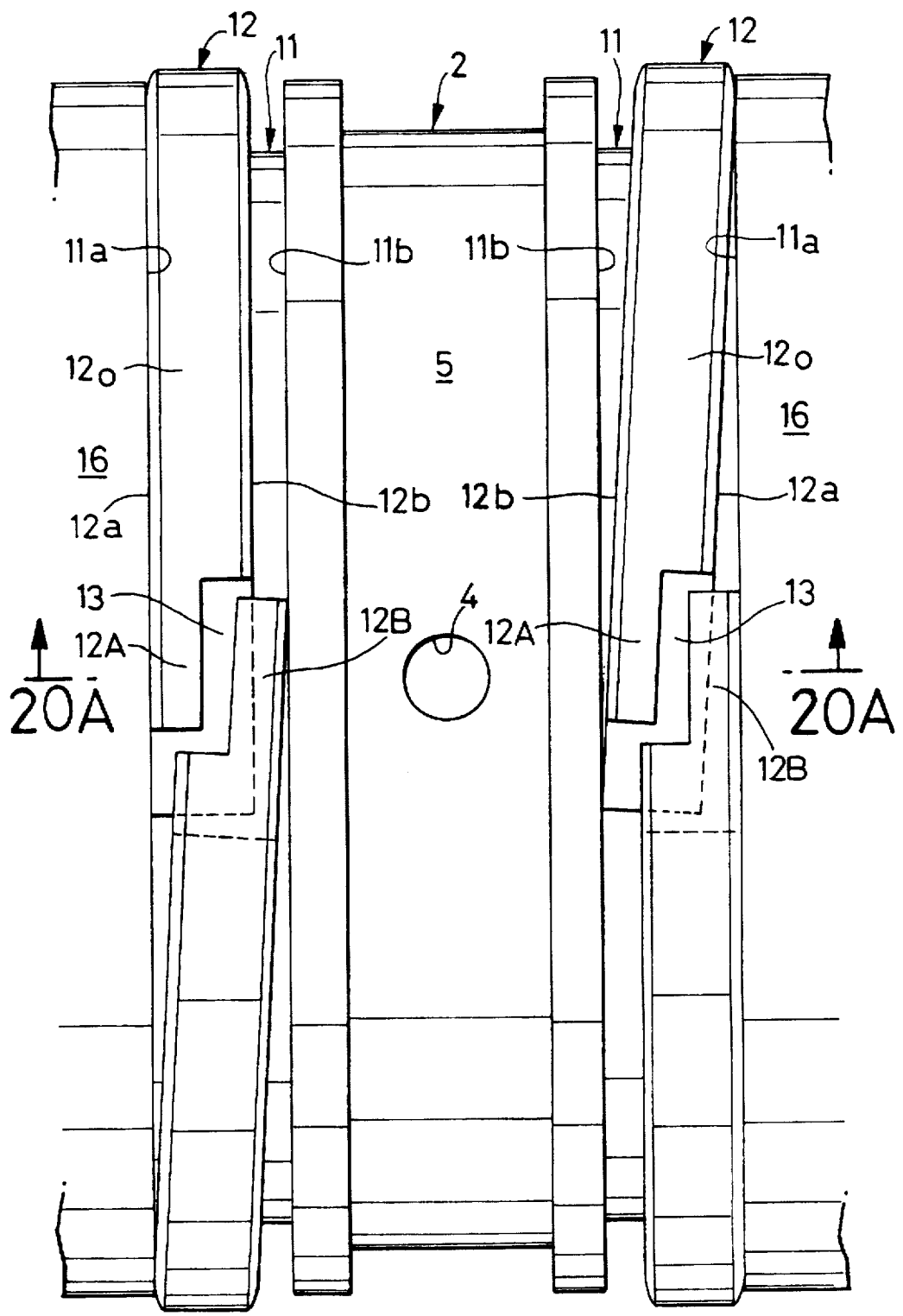
FIG. 18 is a view of a hydraulic sealing device according to a fifth embodiment of the present invention (in a non-sealing state)
Figure 20A:
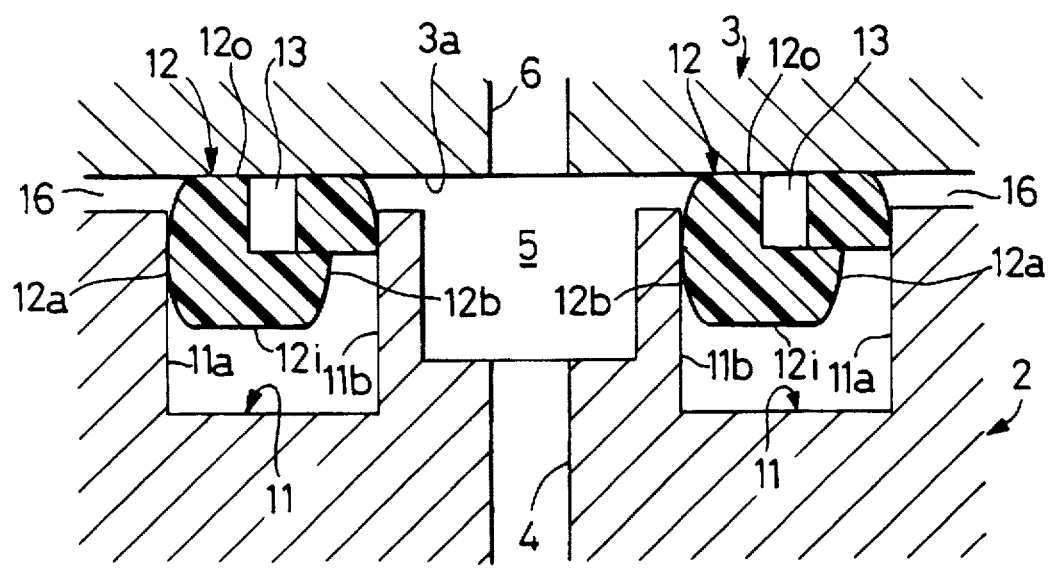
FIGS. 20A and 20B are sectional views taken along the line 20A—20A in FIG. 18 and a sectional view taken along the line 20B—20B in FIG. 19, respectively.

In a seal ring 12 according to the fifth embodiment, one end 12A and the other end 12B formed on opposite sides of an abutment joint 13 are axially offset from each other and, in a free condition in which no hydraulic pressure is applied, the abutment joint 13 is in an open state (see FIGS. 18 and 20A). Therefore, during the releasing operation of the hydraulic actuator 7, the abutment joint 13 of the seal ring 12 is opened to permit the hydraulic pressure to escape into a leak passage 16, thereby preventing a delay in the release of the hydraulic actuator 7 to enhance the responsiveness during the releasing of the operation.

Figure 19:
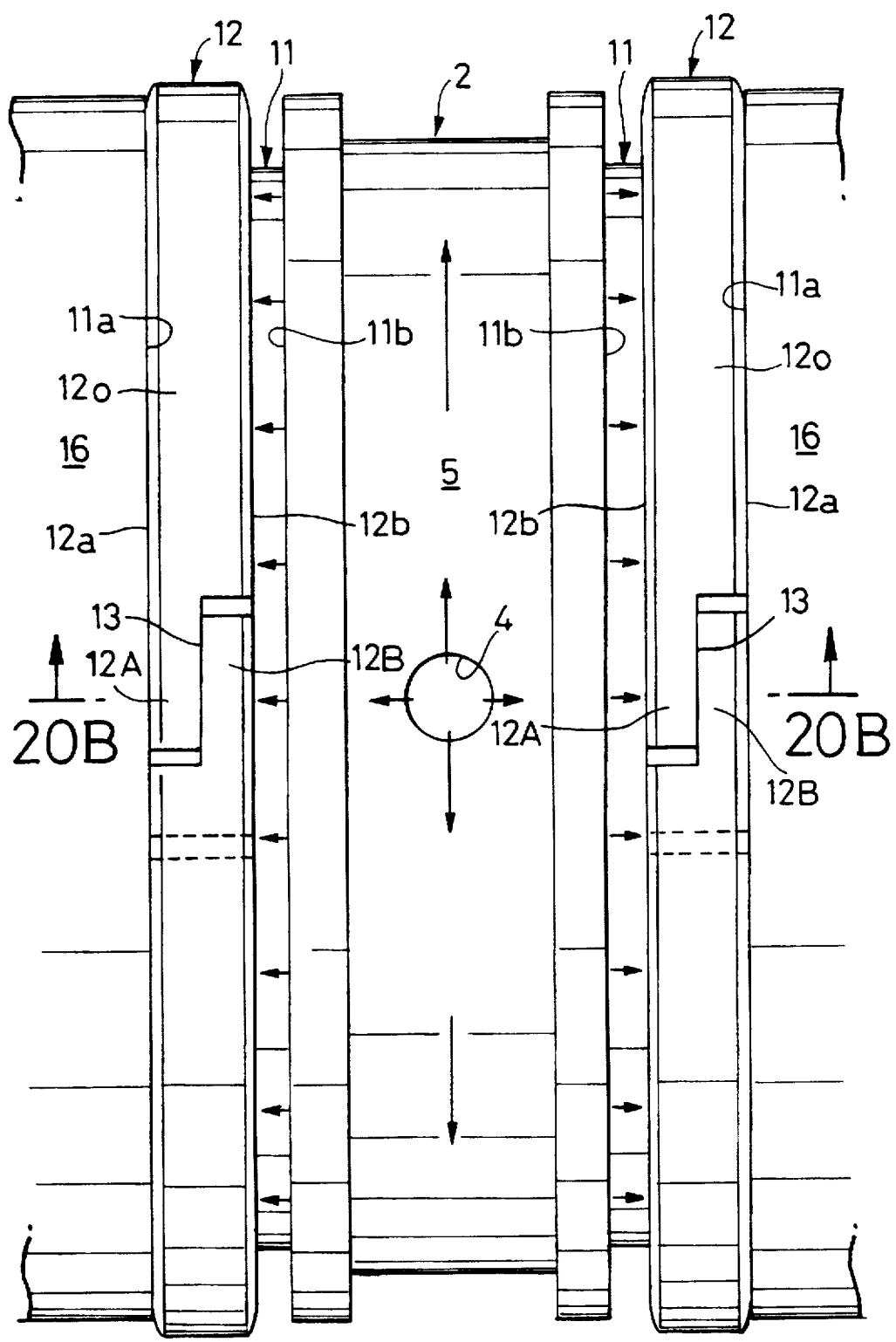
FIG. 19 is a view similar to FIG. 18, but in a sealing state.
Figure 20B:
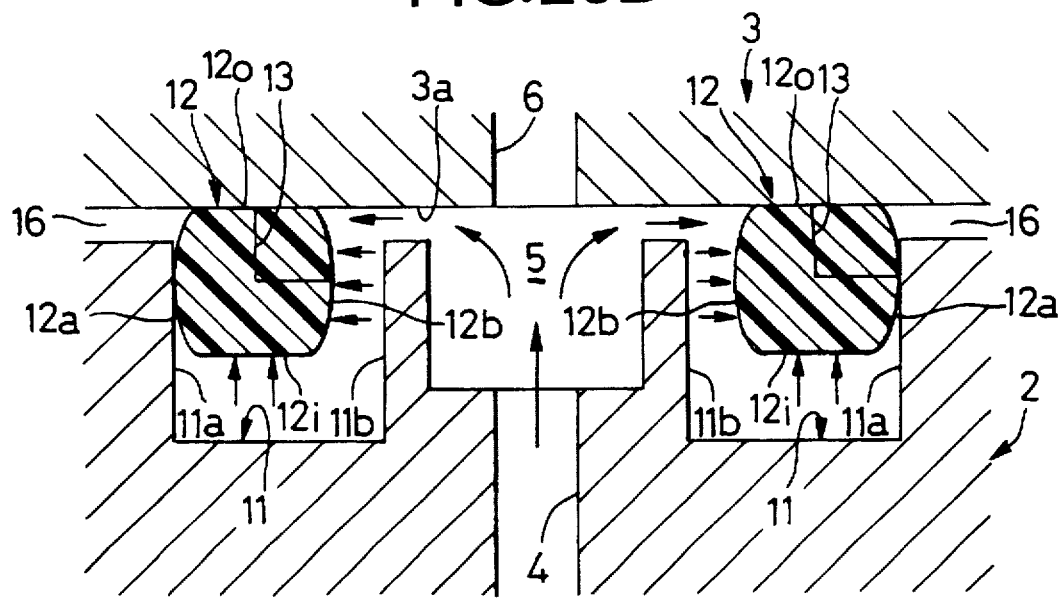

On the other hand, when the hydraulic pressure is applied to the seal ring groove 11 to bring the hydraulic actuator 7 into an engaged state, the seal ring 12 is urged against the sealing inner peripheral surface 3a of the housing 3 and the sealing side 11a of the seal ring groove 11 by the hydraulic pressure applied to the inner peripheral surface 12i and the other side 12b of the seal ring 12, as shown in FIGS. 19 and 20B. As a result, the one end 12A and the other end 12B of the seal ring 12 are brought into axial pressure contact with each other to close the abutment joint 13 and hence, a sealing effect can be exhibited to promptly bring the hydraulic actuator 7 into an engaged state.

In the fifth embodiment, the sealing ring groove 11 may be provided in the housing 3 in place of being provided in the shaft member 2.

Although the embodiments of the present invention have been described in detail, it will be understood that the present invention is not limited to the above-described embodiments, and various modifications in design may be made without departing from the spirit and scope of the invention defined in claims.

For example, in the third and fourth embodiments, the other side 12b of the seal ring 12 does not contribute to the sealing effect and hence, can be formed into a non-crowned flat surface. In place of the shaft member 2 being fixed and rotating the housing 3, the housing 3 may be fixed and the shaft member 2 rotated. Further, the material for the seal ring is not limited to the synthetic resin and may be a proper metal such as a spring steel, phosphor bronze and the like.

We claim:

1. A hydraulic sealing device, comprising an annular seal ring groove formed in one of a radially inner first member and a radially outer second member rotatably fitted with each other, and a seal ring mounted in said seal ring groove to abut against a sealing surface formed on the other of the first and second members, said seal ring having an abutment joint whose opposed ends are wholly superposed on each other in a radial direction and which abutment joint selectively assumes one of an opened state and a closed state during use of said sealing device, wherein one end of said seal ring in a free state is formed such as to be radially offset from the other end and wherein when no hydraulic pressure is applied, said one end of said seal ring is radially spaced apart from said other end to cause said abutment joint to assume said opened state, and when a hydraulic pressure is applied, said one end of said seal ring is urged in a direction to abut against the sealing surface to cause said abutment joint to assume said closed state.

2. A hydraulic sealing device according to claim 1, wherein said seal ring is mounted in said seal ring groove formed in said radially inner first member, said one end of said seal ring being offset radially inwardly from the other end in said opened state so as to be radially spaced apart from the sealing surface formed on the radially outer second member.

3. A hydraulic sealing device according to claim 1, wherein said seal ring is mounted in the seal ring groove formed in said radially outer second member, said one end of said seal ring being offset radially outwardly from the other end in said opened state so as to be spaced apart for the sealing surface formed on the radially inner first member.

4. A hydraulic sealing device according to claim 1, wherein said seal ring is of a generally square or rectangular cross section having four sides, and one said side of said seal ring which is in contact, under pressure, with a sealing side of said seal ring groove is formed into a convex curved surface such that a radially central portion thereof is raised.

5. A hydraulic sealing device according to claim 1, wherein said abutment joint defines a crank-shaped oil channel on the side of an outer or inner peripheral surface of the seal ring which is in contact with said seal surface under pressure for permitting the communication between opposite axial sides of said seal ring, said crank-shaped oil channel comprising a pair of first and second oil channel portions which extend axially and open into both said opposite axial sides of said seal ring, respectively, and a third oil channel portion which extends circumferentially and connects said first and second oil channel portions to each other.

6. A hydraulic sealing device according to claim 5, wherein a portion of said third oil channel portion which faces said sealing surface is closed by a closing wall connected to said outer or inner peripheral surface of said seal ring.

7. A hydraulic sealing device, comprising an annular seal ring groove formed in one of a radially inner first member and a radially outer second member rotatably fitted with each other, and a seal ring mounted in said seal ring groove to abut against a sealing surface formed on the other of the first and second members, said seal ring having an abutment joint whose opposed ends are axially superposed on each other in an axial direction and which abutment joint selectively assumes one of an opened state and a closed state during use of said sealing device, wherein one end of said seal ring in a free state is formed such as to be axially offset from the other end, and wherein when no hydraulic pressure is applied, said one end of said seal ring is axially spaced apart from said other end to cause said abutment joint to assume said opened state, and when a hydraulic pressure is applied, said one end of said seal ring is urged in a direction to abut against said other end to cause said abutment joint to assume said closed state.

8. A hydraulic sealing device, comprising a cylindrical first member and a cylindrical second member concentrically and rotatably mounted with respect to each other, an annular seal ring groove formed in one of either said first member or second member with a sealing surface formed on the other of said first and second members at a location opposite said annular seal ring groove, and a seal ring mounted in said seal ring groove to abut against said sealing surface, said seal ring having an abutment joint formed by opposed ends superposed on each other, said abutment joint selectively assuming one of an opened state and a closed state during use of said sealing device, one said opposed end of said seal ring being formed to be offset from the other said opposed end in a free state and, when no hydraulic pressure is applied, for causing said abutment joint to assume said opened state and allow oil to leak through the open abutment joint, said one opposed end of said seal ring being urged in a direction to abut against said other opposed end and cause said abutment joint to assume said closed state when hydraulic pressure is applied.

9. A hydraulic sealing device according to claim 8, wherein said first member is radially inward of said second member, said seal ring is mounted in said seal ring groove formed in said first member, said one opposed end of said seal ring being formed such as to be offset radially inwardly from said other opposed end such that said one opposed end is radially spaced apart from said sealing surface formed on said second member when no hydraulic pressure is applied.

10. A hydraulic sealing device according to claim 8, wherein said seal ring groove is formed in said second member which is radially outward of said first member, said seal ring is mounted in the seal ring groove formed in said second member, said one opposed end of said seal ring being formed such as to be offset radially outwardly from said other opposed end, whereby said one opposed end is radially spaced apart from said sealing surface formed on said inner first member when no hydraulic pressure is applied.

11. A hydraulic sealing device according to claim 8, wherein said one opposed end of said seal ring is formed such as to be offset axially from said other opposed end such that said one end is spaced apart from said other opposed end in an axial direction when no hydraulic pressure is applied.

12. A hydraulic sealing device according to claim 8, wherein said seal ring has a generally square or rectangular cross section having four sides, at least one of said sides being a seal side in contact with a sealing side of said seal ring groove, said seal side being formed into a convex curved surface.

13. A hydraulic sealing device according to claim 8, wherein said abutment joint defines an oil channel through said seal ring in an axial direction for permitting hydraulic oil communication between axially opposite sides of said ring seal when no hydraulic pressure is applied.

14. A hydraulic sealing device according to claim 13, wherein said oil channel includes a portion which has a restricted cross-sectional flow area of a size effective for preventing the flow therethrough of foreign materials larger than about 100 μm.

15. A hydraulic sealing device according to claim 8, wherein said abutment joint defines a crank-shaped oil channel on a peripheral surface of said seal ring which is contacted with said seal surface under hydraulic pressure for permitting hydraulic oil communication between opposite axial sides of said seal ring, said crank-shaped oil channel comprising a pair of first and second oil channel portions which extend axially and open into both said opposite axial sides of said seal ring, respectively, and a third oil channel portion which extends circumferentially and connects between said first and second oil channel portions.

16. A hydraulic sealing device according to claim 15, wherein a portion of said third oil channel portion which faces said sealing surface is closed by a closing wall connected to said peripheral surface of said seal ring.

17. A hydraulic sealing device according to claim 15, wherein said third oil channel includes a portion which has a restricted cross-sectional shape and size having one dimension between 50 μm and 100 μm for preventing the flow of particles larger than said dimension through said third oil channel.

* * * * *